(No Model.)

E. A. SPERRY.
COUPLING FOR ELECTRIC OR OTHER POWER TRANSMISSION.

No. 562,499. Patented June 23, 1896.

Witnesses.
L. P. Abell
M. Nielsen.

Inventor.
Elmer A. Sperry.

UNITED STATES PATENT OFFICE.

ELMER A. SPERRY, OF CLEVELAND, OHIO, ASSIGNOR, BY MESNE ASSIGNMENTS, TO THE GENERAL ELECTRIC COMPANY, OF NEW YORK.

COUPLING FOR ELECTRIC OR OTHER POWER TRANSMISSION.

SPECIFICATION forming part of Letters Patent No. 562,499, dated June 23, 1896.

Application filed July 3, 1894. Serial No. 516,460. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Couplings for Electric or other Power Transmission, of which the following is a specification.

This invention relates to methods of coupling shafts designed for relative movement; longitudinally, as to alinement, with axes at an angle to each other, and also with reference to inclosing or lubricant-containing devices connected therewith. The same is fully described and illustrated in the following specification and accompanying drawings, the novel features being pointed out in the claims annexed to said specification.

Figure 1:
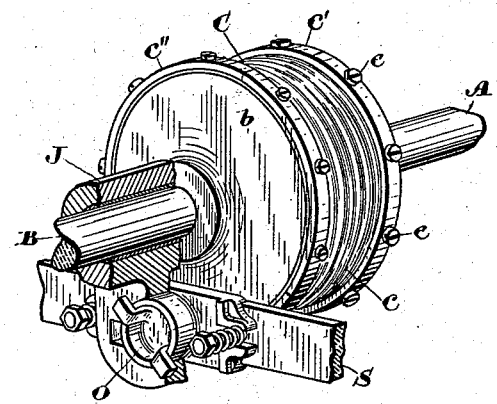
Figure 2:
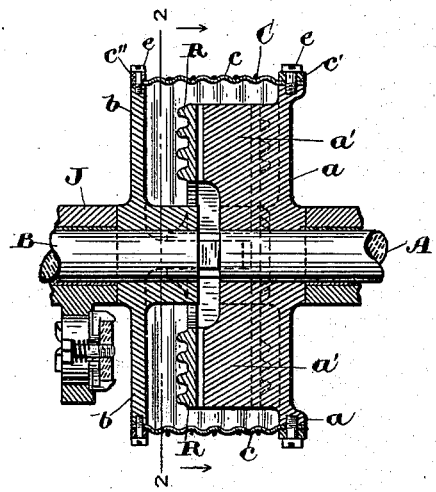
Figure 3:
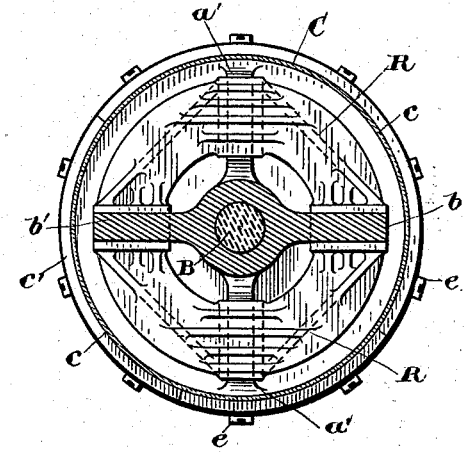

In the drawings, Figure 1 is an isometrical view of the clutch or coupling as a whole. Fig. 2 is a longitudinal section of same. Fig. 3 is a section on line 2 2 of Fig. 2.

Like letters of reference indicate similar parts throughout.

The axle A is connected with the axle B by means of the coupling C, which is a varied form of that shown in my application, Serial No. 516,461, filed July 3, 1894. Upon the axle A is mounted a disk $a$, having two wings $a'$ $a'$ (see Fig. 3) protruding laterally therefrom. The disk $b$ $b$ serves the same function and may be attached to and revolve with the wings $b'$ $b'$. It will be seen that the wings $b'$ $b'$ may not be a portion of the disk for obvious reasons of machining, &c., though for strength it may be preferable to have them so formed, and the invention extends to their use in either form. The outer periphery of the disk $b$ $b$ may be circular in form, as shown, and serves for attachment of the flexible containing-shell $c$, which may be of leather, rawhide, fabric, or other suitable material either flexible or resilient. Rings $c'$ $c''$, preferably split or in sections, and screws $e$ serve to secure this material to each of the revolving portions. The wings $a'$ $b'$ coöperate with a loose slotted ring or float R. This float consists, preferably, of two parallel annular plates united at four points, preferably ninety degrees apart, by cross-partitions, the plates being cut away on opposite sides, so as to form radial slots in the two faces of the float, the sides of the slot being the cross-partitions. On the face of each plate at the back of the slots are strengthening-ribs running, preferably, across the line of the slot. The plates may be still further stiffened by flanges along the edges of the slots and buttresses supporting the same. The shaft B may revolve in a journal-bearing, as J, and be supported upon the cross-bar S with a support of the well-known form indicated at O, described in my application, Serial No. 513,634, filed June 6, 1894. I prefer to corrugate the exterior shell $c$, which accommodates all the motions referred to with reference to the two shafts, and which is better able thereby to withstand the centrifugal force and retain the rings or bands C, which still further support the casing against such strains. This is true whether the inclosing casing $c$ revolves or not, so long as the coupling revolves inside same.

The use and operation will be understood from the foregoing.

One of the advantages arising from the use of this coupling is that no special attention need be paid to the alinement of the shafts, and the coupling is applicable to any form of machinery, especially for coupling revolving parts of motor-driven trucks.

I do not confine myself to the exact construction of the device shown and described, as it is evident the apparatus may be largely modified without departing from the spirit of the invention, and although it is designed to use all these features in connection with each other, yet it is obvious that some may be used without the others, and the invention extends to such use.

Having described my invention, what I claim as new, and desire to secure by Letters Patent, is—

1. In a coupling for shafts, the combination of winged projections extending from each shaft with their planes normally at right angles to each other, an independent float for connecting said wings mutually supported by each of the wings, and a flexible inclosing housing revolving with said coupling.

2. In a coupling for shafts, the combination of winged projections extending from each shaft with their planes normally at right angles to each other, an independent float for connecting said wings mutually supported by each of the wings, and an inclosing flexible housing mounted upon both shafts and revolving therewith.

3. In a coupling for shafts, the combination with winged projections extending from each shaft, of a disk connected with such projections, an inclosing housing for the coupling connected with said disk, and an independent float coöperating with the projections.

4. In a coupling for shafts, the combination of winged projections extending from each shaft, a disk connected with such projections, a flexible inclosing housing for the coupling connected with said disk, and an independent float coöperating with the projections.

5. In a coupling for shafts, the combination of winged projections extending from each shaft with their planes normally at right angles to each other and lying in the same plane of rotation, a float consisting of a disk with notches at right angles to each other sunk into but not through the disk laterally from opposite faces thereof, and ribs upon the face of the float located at the back of the slot and transverse to the same.

6. In a coupling for shafts, disks mounted upon the shafts, projections also mounted upon each shaft engaging a common float, in combination with the inclosing housing $c$, the rings $c'$ and screws $e$.

7. In a coupling for shafts, revolving coupling mechanism, a flexible inclosing casing for such mechanism, means for revolving the casing, and retaining rings or bands outside such casing.

ELMER A. SPERRY.

Witnesses:
M. NIELSON,
FRED CHEETHAM.